(12) United States Patent
Willinger et al.

(10) Patent No.: US 7,681,529 B2
(45) Date of Patent: Mar. 23, 2010

(54) DIFFUSER AND ANCHOR

(75) Inventors: Jonathan Willinger, Tenafly, NJ (US);
Peter Ragonetti, Brooklyn, NY (US)

(73) Assignee: J.W. Pet Company, Inc., Teterboro, NJ (US)

( * ) Notice: Subject to any disclaimer, the term of this patent is extended or adjusted under 35 U.S.C. 154(b) by 0 days.

(21) Appl. No.: 12/101,522

(22) Filed: Apr. 11, 2008

(65) Prior Publication Data

US 2008/0251029 A1 Oct. 16, 2008

Related U.S. Application Data

(63) Continuation of application No. 29/298,482, filed on Dec. 6, 2007, now Pat. No. Des. 598,611.

(60) Provisional application No. 60/923,082, filed on Apr. 12, 2007.

(51) Int. Cl.
*A01K 63/04* (2006.01)

(52) U.S. Cl. ..................................................... 119/263

(58) Field of Classification Search ................. 119/263, 119/249, 256, 269, 253, 254, 267; 248/201, 248/264, 268, 671, 309.2; D30/101, 104, D30/106

See application file for complete search history.

(56) References Cited

U.S. PATENT DOCUMENTS

| | | | |
|---|---|---|---|
| 2,824,728 A | 2/1958 | Howard | |
| 3,326,184 A | 6/1967 | Greenbaum | |
| 3,326,185 A * | 6/1967 | Perez | 119/254 |
| 3,396,949 A | 8/1968 | Tsamas | |
| 3,507,253 A | 4/1970 | Willinger | |
| D224,238 S | 7/1972 | Willinger | |
| 3,796,858 A | 3/1974 | Cohn | |
| D232,102 S | 7/1974 | Willinger et al. | |
| 3,929,102 A | 12/1975 | Suchowski et al. | |
| D249,879 S | 10/1978 | Willinger | |
| D249,897 S | 10/1978 | Willinger | |
| 4,185,743 A | 1/1980 | Willilnger | |
| D292,439 S | 10/1987 | Richter | |
| 5,133,906 A | 7/1992 | Louis | |
| 5,256,282 A | 10/1993 | Chang et al. | |
| 5,476,068 A | 12/1995 | Townsend | |
| 6,276,303 B1 | 8/2001 | Van Kley | |
| 6,332,430 B1 | 12/2001 | Santa Cruz et al. | |
| 6,474,266 B1 | 11/2002 | Arnett | |
| 6,499,766 B1 * | 12/2002 | Schroeder | 281/21.1 |
| D535,720 S | 1/2007 | Porter et al. | |

* cited by examiner

*Primary Examiner*—T. Nguyen
(74) *Attorney, Agent, or Firm*—Katten Muchin Rosenman LLP

(57) ABSTRACT

An aquarium aerator unit includes an anchor that is weighted by an aquarium bedding material. The anchor includes a lower portion that has a defined edge and spaced-apart side sections proximate to the lower portion. An inner space is formed between the side sections above the lower portion. The defined edge provides a shovel edge that eases the lower portion into the bedding material and the inner space storing the bedding material to enhance stability and aesthetics.

17 Claims, 10 Drawing Sheets

4 INCH, 6 INCH AND 12 INCH ANCHOR STONES

AIR CORE STONES

2 INCH AIR CORE STONE

1 INCH AIR CORE STONE

4 INCH, 6 INCH AND 12 INCH AIR CORE STONE

2 INCH ANCHOR STONE

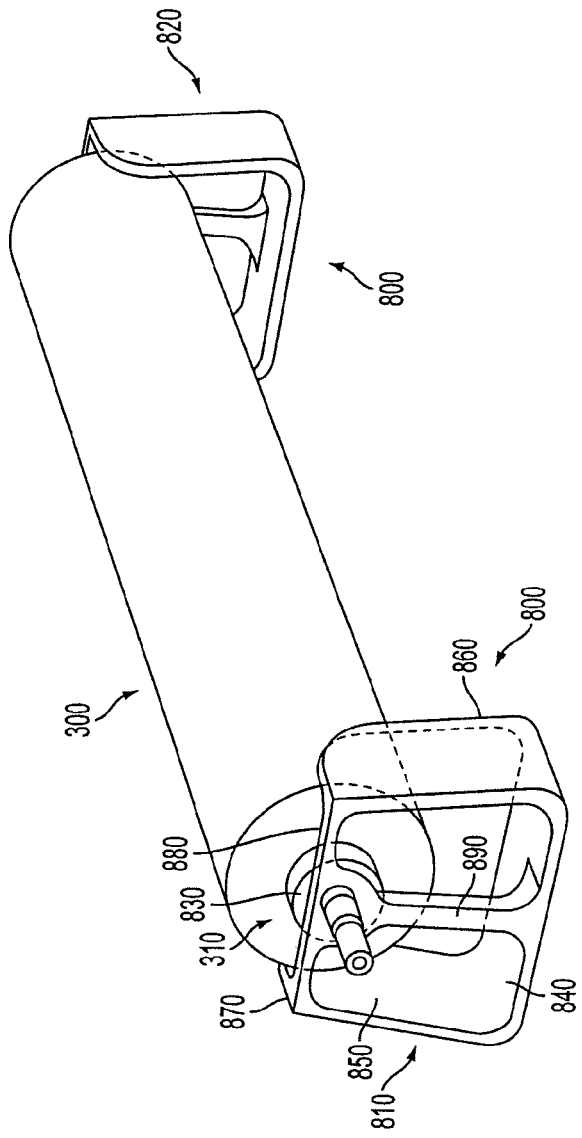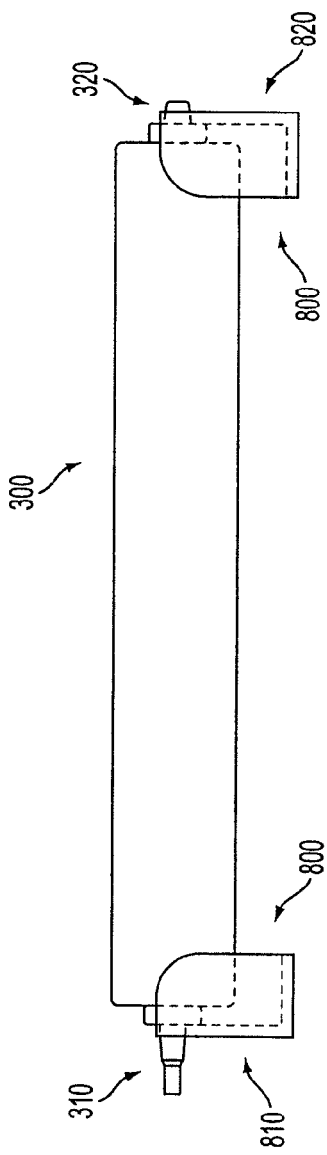

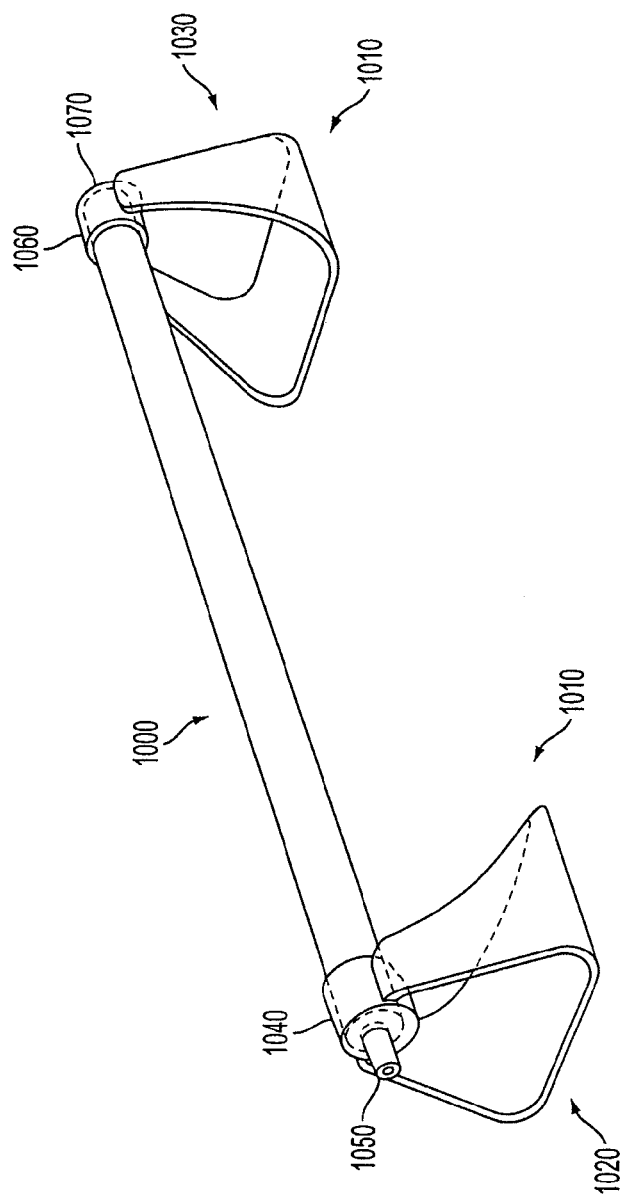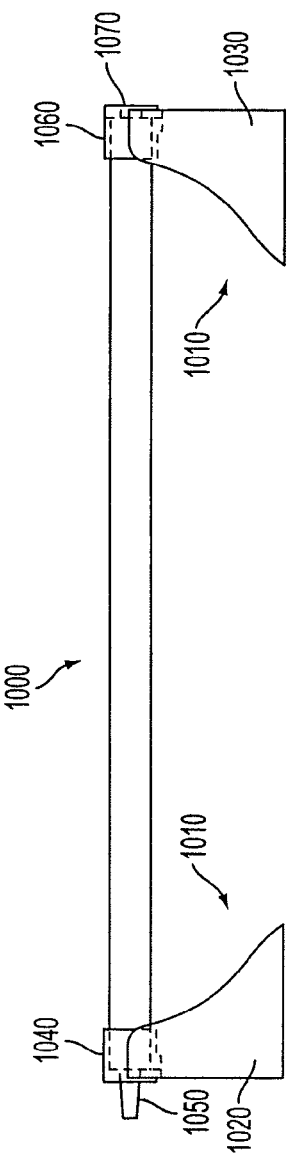
FIG. 10
FIG. 11

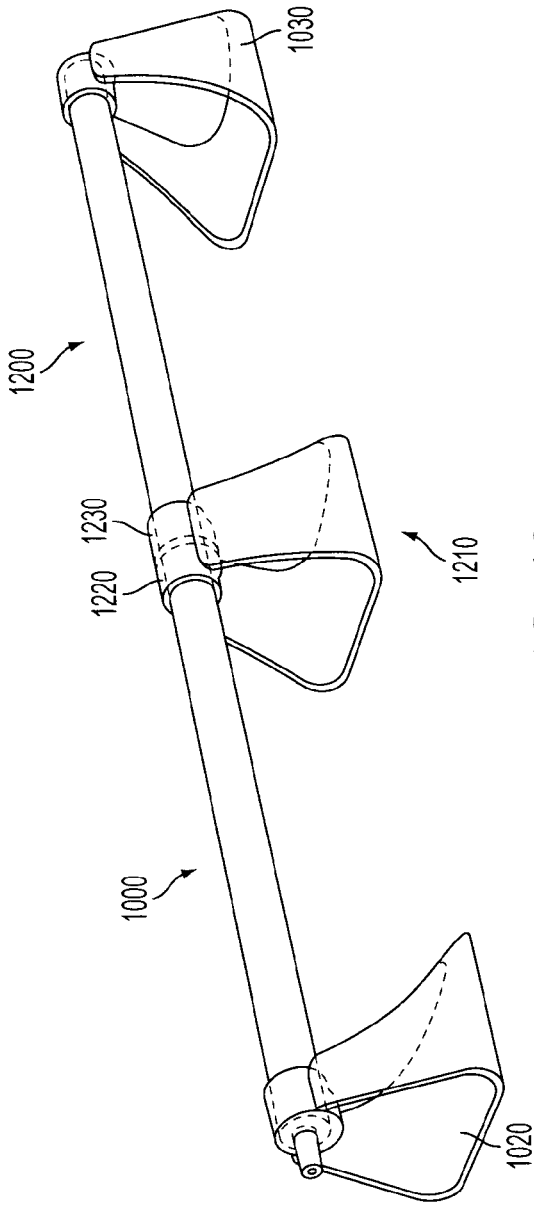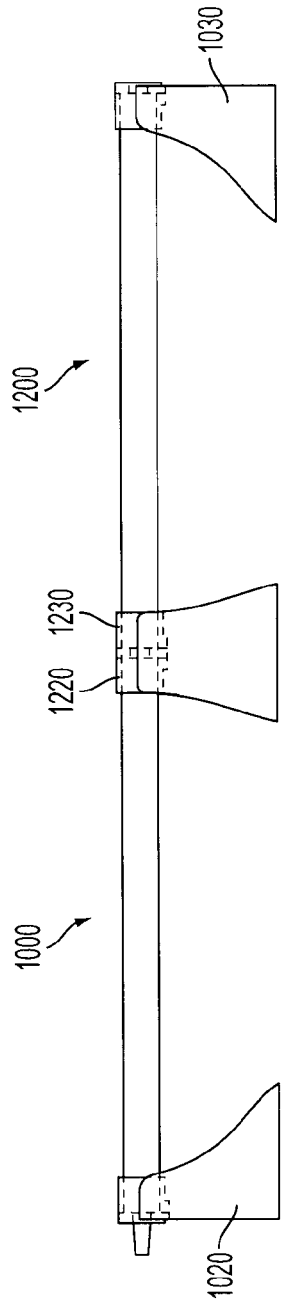
FIG. 12
FIG. 13

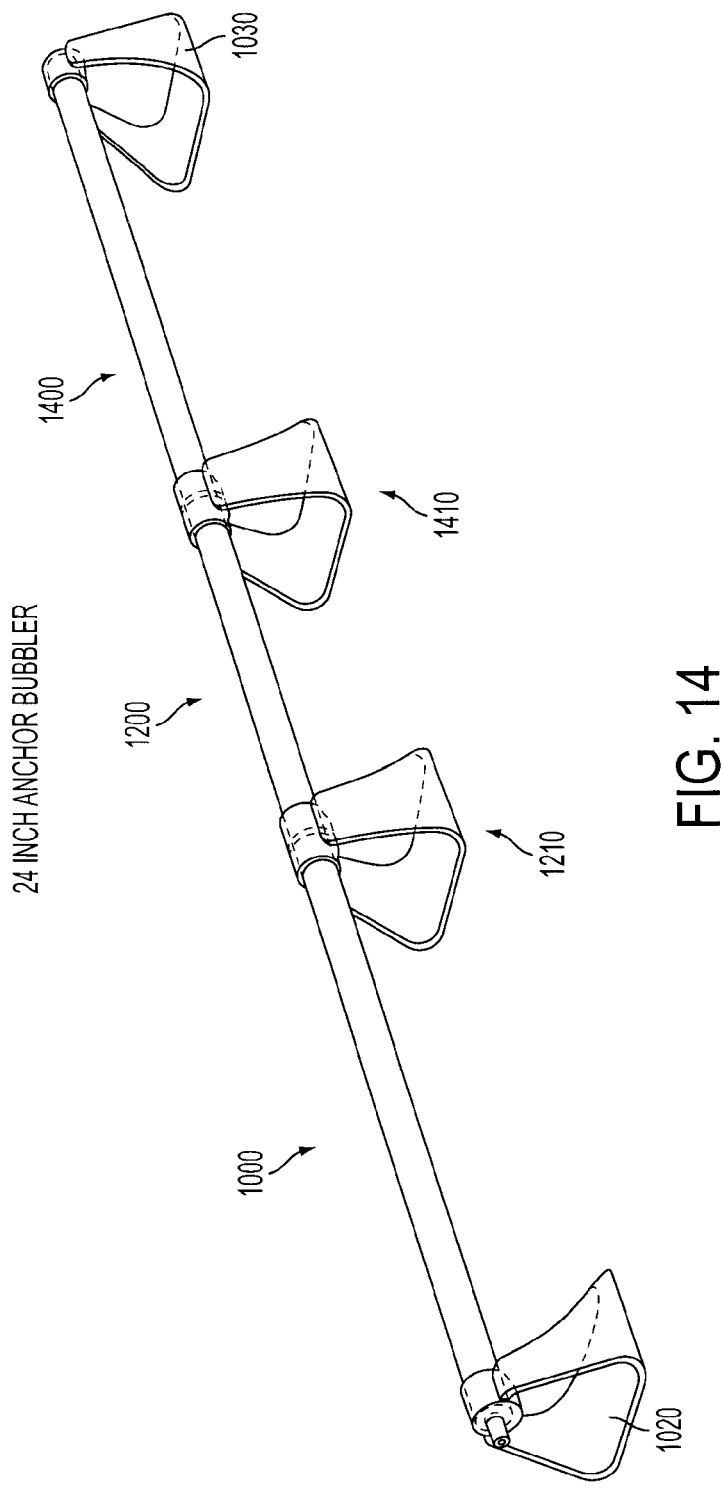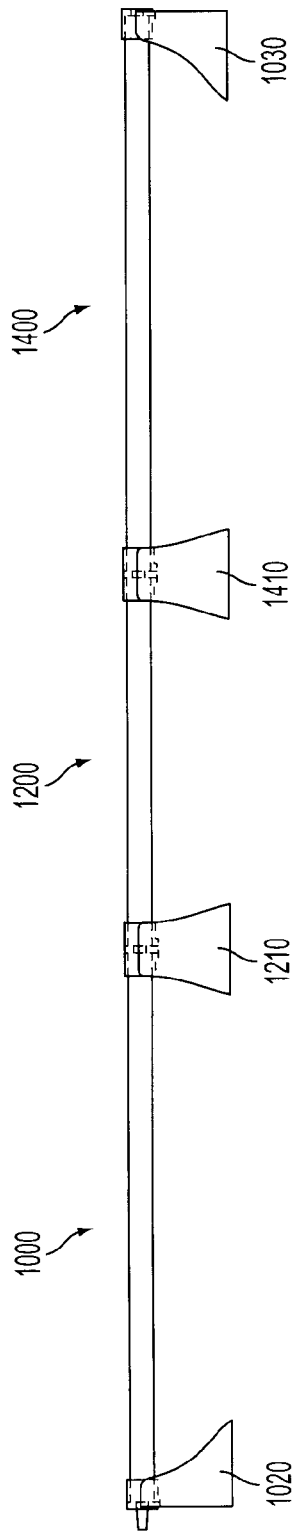
FIG. 14
FIG. 15

DIFFUSER AND ANCHOR

CROSS-REFERENCE TO RELATED APPLICATIONS

This application is a non-provisional counterpart to and claims priority from U.S. Ser. No. 60/923,082 filed on Apr. 12, 2007, which is pending and which is herein incorporated by reference for all purposes in its entirety.

This application is a continuation of and claims priority from U.S. Ser. No. 29/298,482 filed on Dec. 6, 2007, which is pending and which is herein incorporated by reference for all purposes in its entirety.

FIELD OF THE INVENTION

The present invention relates to aquarium and water treatment devices and methods. More particularly, the present invention relates to an assembled unit, e.g., an aquarium aerator unit, including an aeration stone or tube, i.e. diffuser, an anchor device, and a method of using the assembled unit.

BACKGROUND

Aquariums are typically used for pet fish. Aerators may be used to oxygenate the water in an aquarium, and may also provide an aesthetically pleasing element. Aerators typically function by bubbling air from the bottom of a tank to add oxygen to the water. Oxygenation of the water may be improved by reducing the size of the bubbles and thereby increasing the total surface area in contact with the water relative to the amount of air being disbursed. Aerators have typically been plastic tubes having holes therein, which may be positioned underneath the stones or sand in the aquarium. Aerators should counteract the tendency of the air tube or other device to float.

SUMMARY OF THE INVENTION

The present invention provides a system and device for providing an even distribution of fine bubbles from an aeration device with an integrated anchor system.

An aquarium aerator unit includes an anchor that is weighted by an aquarium bedding material. The anchor includes a lower portion that has a defined edge and spaced-apart side sections proximate to the lower portion. An inner space is formed between the side sections above the lower portion. The defined edge provides a shovel edge that eases the lower portion into the bedding material and the inner space storing the bedding material to enhance stability and aesthetics.

An aquarium aerator system includes a plurality of anchors. Each anchor includes a lower portion, a side portion, and an inner space defined between the side portions above the lower portion. The inner space receives aquarium bedding material to weight the anchors. The system further includes a plurality of diffusers. Each diffuser is supported by at least one anchor of the plurality of anchors above the bedding material. At least one anchor comprises an air inlet for receiving pressurized air and at least one anchor comprises a receiving portion configured to communicate pressurized air from one to diffuser to another diffuser.

A method is also disclosed.

BRIEF DESCRIPTION OF THE FIGURES

FIG. 8 illustrates the third exemplary airstone aerator with a second exemplary anchor system from a perspective view.

FIG. 9 illustrates the third exemplary airstone aerator with the second exemplary anchor system from a side view.

FIG. 10 illustrates a fourth exemplary aerator system with a third exemplary anchor system from a perspective view.

FIG. 11 illustrates the fourth exemplary aerator system with the third exemplary anchor system with a side view.

FIG. 12 illustrates an extension of the fourth exemplary aerator system with the third exemplary anchor system including an extension anchor system from a perspective view.

FIG. 13 illustrates the embodiment shown in FIG. 12 from a side view.

FIG. 14 illustrates a further extension of the embodiment shown in FIG. 12 from a perspective view including two extension anchor systems.

FIG. 15 illustrates the embodiment shown in FIG. 14 from a side view.

DETAILED DESCRIPTION

Figure 1:
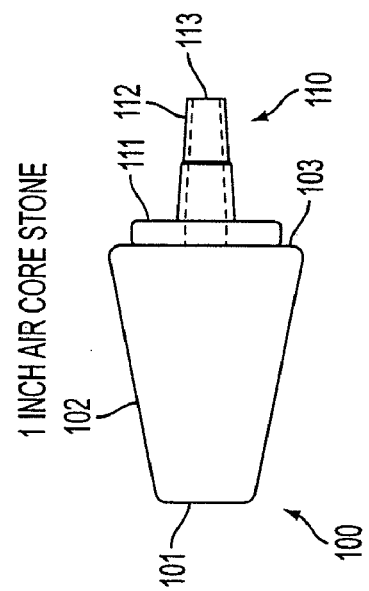
FIG. 1 illustrates a first exemplary embodiment of an airstone aerator.

FIG. 1 illustrates the first exemplary embodiment of airstone aerator 100, e.g., diffuser. Although, the application uses an airstone aerator, any other suitable aerator may be used. Airstone aerator 100 connects to intake air connector 110 which is connected to an air pressure source. Airstone aerator 100 may be formed into the shape of a conical frustum, also referred to herein as a truncated cone. The conical frustum of airstone aerator 100 is a cone that is created by slicing the top off a cone, with the cut made parallel to the base. Alternative angles for the slice, the base, and/or the sides of airstone aerator 100 are also possible. Airstone aerator 100 may include end section 101, side surface 102, and base section 103. Airstone aerator 100 may be substantially hollow to allow the passage of pressurized air throughout the interior of airstone aerator 100.

Airstone aerator 100 may be composed of a porous material that allows the passage of air from an interior to an exterior portion of the airstone aerator 100. In particular, airstone aerator may be composed of an epoxy resin compound that may include sand or another fine material.

Intake air connector 110 may be comprised of plastic or another suitable material. Intake air connector 110 may include base 111, stem 112, and air passageway 113. Base 111 may be in the shape of a disc or another appropriate shape, and may be adapted to contact in an airtight manner base section 103 of airstone aerator 100. Stem 112 may be adapted to connect to an air hose in an airtight manner and may have a tapering cross-section to facilitate attachment to an air hose. Air passageway 113 may be adapted to communicate pressurized air from an air hose to an interior of airstone aerator 100.

Figure 2:
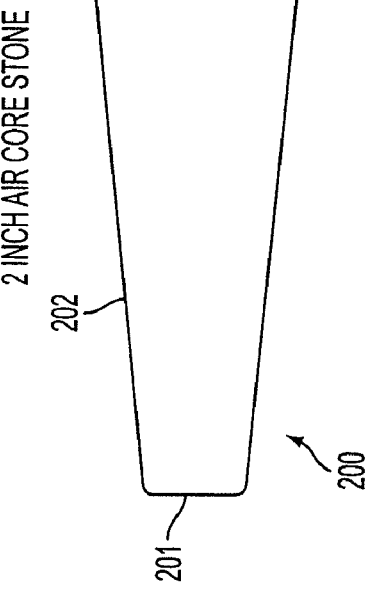
FIG. 2 illustrates a second exemplary embodiment of an airstone aerator.

FIG. 2 illustrates the second exemplary embodiment of airstone aerator 200, e.g., diffuser. Airstone aerator 200 connects to intake air connector 110 which is connected to an air pressure source. Airstone aerator 200 also may be formed into the shape of a conial frustum, with dimensions varying for the plane and angles in the same manner as airstone aerator 100. Airstone aerator 200 may include end section 201, side surface 202, and base section 203. In particular, Airstone aerator 200 may have a longer side surface 202 than airstone aerator 100, so that the angle between either of the plane sections of end section 201 or base section 203 and side surface 202 may be closer to 90 degrees than the embodiment of airstone aerator 100.

Airstone aerator 200 which also may be composed of a porous material that allows the passage of air from an interior to an exterior portion of the airstone aerator 200. In particular, airstone aerator may be composed of an epoxy resin compound that may include sand or another fine material. Airstone aerator 200 may be substantially hollow to allow the passage of pressurized air throughout the interior of airstone aerator 200. Airstone aerator 200 may also attach to intake air connector 110 as a source of pressurized air in the same manner as airstone aerator 100.

Figure 3:
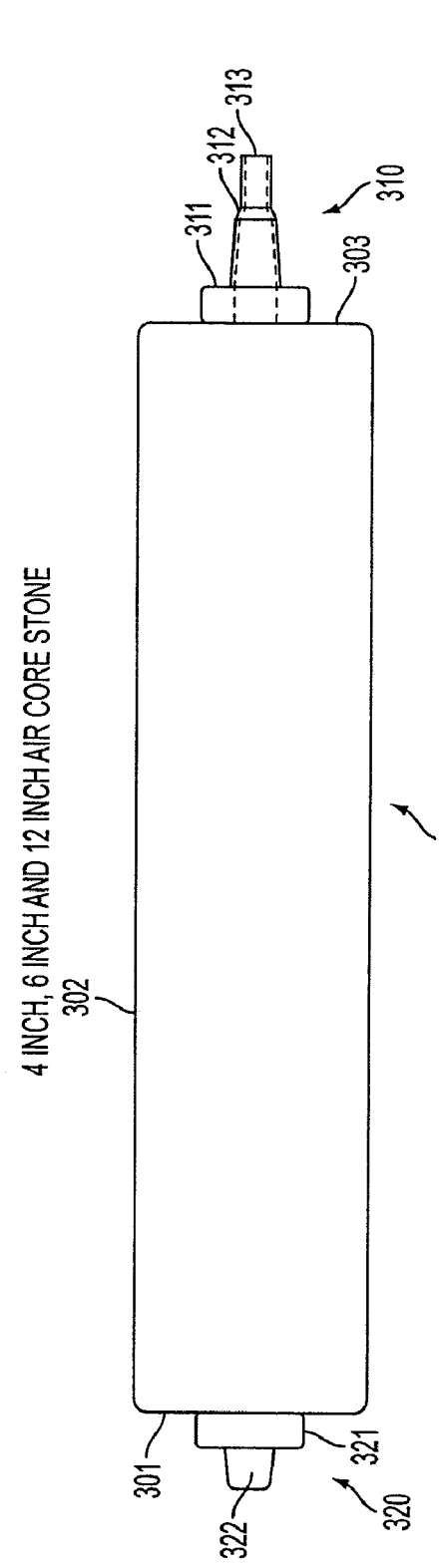
FIG. 3 illustrates a third exemplary embodiment of an airstone aerator.

FIG. 3 shows airstone aerator 300 which is in the form of a cylinder and which is also composed of a porous material which may be of the same type as airstone aerators 100 or 200. Airstone aerator 300 may include cylindrical portion 302 and opposite face 301 and intake face 303. Intake face 303 includes a hole located approximately in the center of intake face 303 which may lead to an interior space that extends the length of airstone aerator 300. Opposite face 301 may also include a centrally located hole, which may be the same size as the hole in intake face 303. Therefore, opposite face 301 and intake face 303 may be interchangeable.

Airstone aerator 300 connects to intake air connector 310 which also may be composed of plastic or another suitable material. Intake air connector 310 may be of a different form than intake air connector 110. Intake air connector 310 may extend into airstone aerator 300 some distance. The portion of intake air connector 310 which extends into the interior of airstone aerator 300 may include periodically spaced openings to allow the even distribution of pressurized air to the interior portion of airstone aerator 300, thereby allowing air to be evenly distributed into the porous interior of airstone aerator 300. In this manner, pressurized air may be expelled from airstone aerator 300 in an even manner. Intake connector 310 may include base 311, stem 312, and air passageway 313. Base 311 may be in the shape of a disc or another appropriate shape, and may be adapted to contact in an airtight manner intake face 303 of airstone aerator 300. Stem 312 may be adapted to connect to an air hose in an airtight manner and may have a tapering cross-section to facilitate attachment to an air hose. Air passageway 313 may be adapted to communicate pressurized air from an air hose to an interior of airstone aerator 300.

Opposing stop 320 which also may be composed of plastic or another suitable material. Opposing stop 320 may include base 321 and stem 322. Base 321 may be in the shape of a disc or another appropriate shape, and may be adapted to contact in an airtight manner opposite face 301 of airstone aerator 300. Stem 322 may be adapted to connect to an anchoring system.

Figure 4:
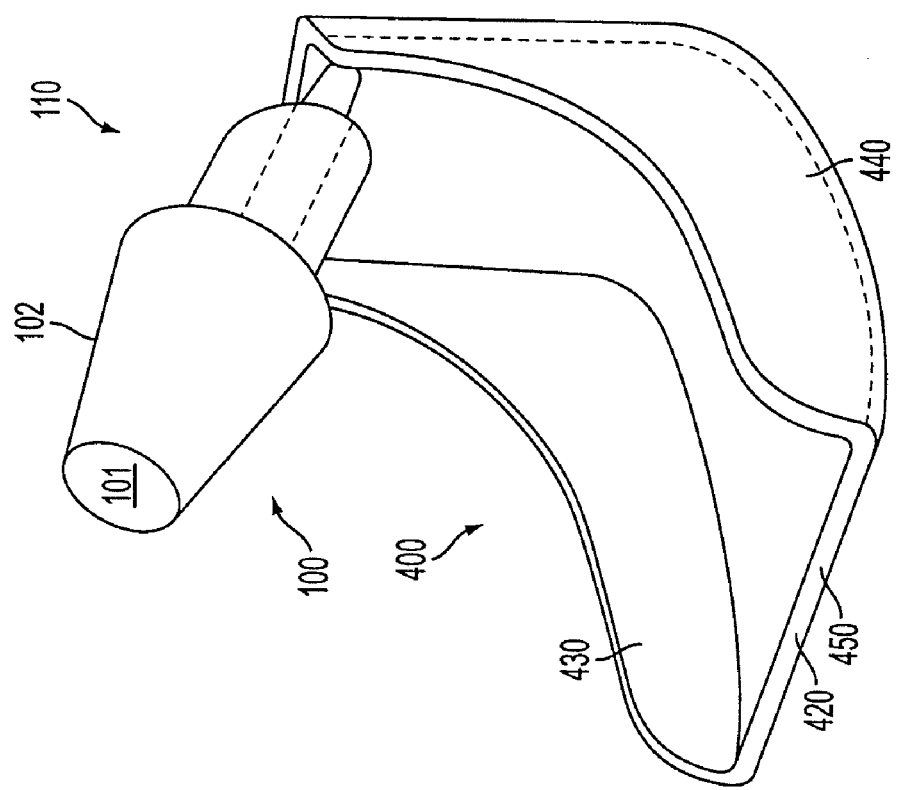
FIG. 4 illustrates the first exemplary airstone aerator with a first exemplary anchor system from a perspective view.

FIG. 4 illustrates airstone aerator 100 and intake air connector 110 connected to anchor system 400 to form an aquarium aerator unit. Intake air connector 110 may connect to anchor system 400 by inserting intake air connector 110 through a hole in anchor system 400 which may be circular or of another shape which matches the shape of stem 112 of intake air connector 110.

Alternatively, stem 112 of intake air connector 110 may be pressed into a U-shaped form that may provide a friction grip with stem 112.

Anchor system, e.g., anchor, 400 may comprise a substantially L-shape and includes upright portion 410, lower portion 420, and side sections 430 and 440. Upright portion 410 may be substantially planar and may be orientated substantially vertically in a position of use of the airstone aerator, e.g., diffuser. Lower portion 420 may have a curve or may be of a similar shape to promote the insertion of anchor system 400 into a sandy or gravel material in the bottom of an aquarium, e.g., bedding material. Additionally, lower portion 420 may terminate in a defined edge 450, which facilitates insertion of anchor system 400 in sand or gravel. Side portions 430 and 440 may extend from an end of lower portion 420 to upright portion 410 and/or may extend to the top of lower portion 440. Side portions 430 and 440 may provide a barrier for sand or gravel that is shoveled into anchor system 400 during the emplacement of airstone aerator of 100 by preventing the sand or gravel from escaping out the sides of anchor system 400.

Figure 6:
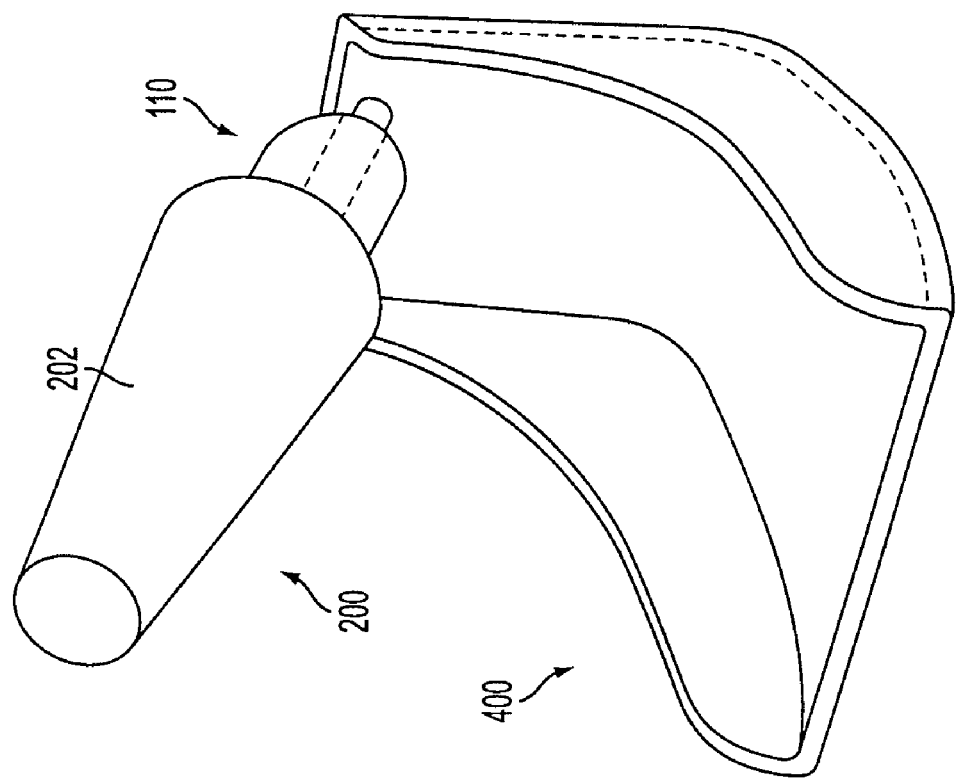
FIG. 6 illustrates the second exemplary airstone aerator with the first exemplary anchor system from a perspective view.

As is evident in FIGS. 4 and 6, anchor 400 is wider at edge 450 and narrows where lower upright portion 410 and lower portion 420 meet to permit easier grasping by a user as the lower portion is inserted as well as for more easily retaining bedding material. The anchor includes a first inner space defined by lower portion 420 and portions of side members 430 and 440 that are proximate to the lower portion. The anchor further includes the upright portion that retains the bedding material and also elevate the airstone aerator above the bedding material.

Figure 5:
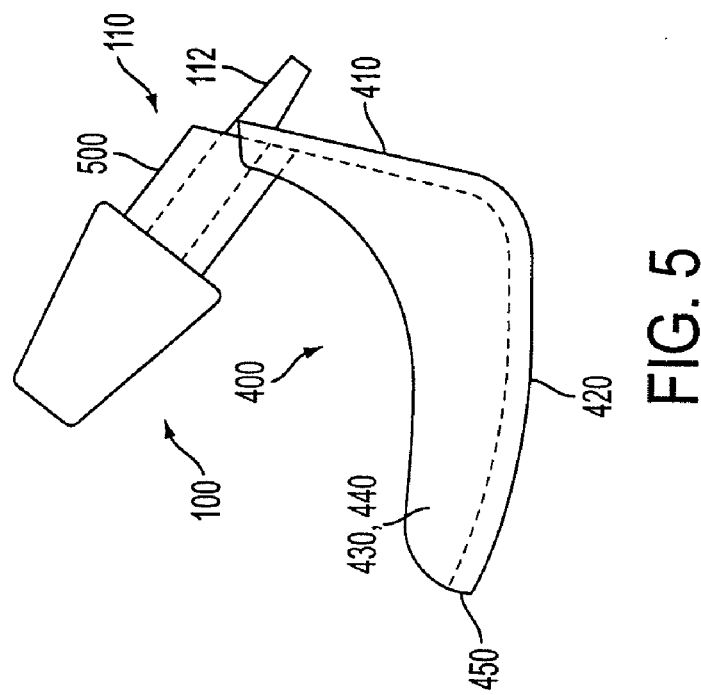
FIG. 5 illustrates the first exemplary airstone aerator with the first exemplary anchor system from a side view.

FIG. 5 shows a side view of airstone aerator 100 including intake air connector 110 and anchor system 400, including upright portion 410, lower portion 420, and edge 450. Side portions 430 and 440 are also shown in this side view and the shape of side portions 430 and 440 is shown. Intake air connector 110 in FIG. 5 does not include a disc shaped portion, but rather includes cylindrical positioning element 500 which is adapted to contact upright portion 410 to position airstone aerator 100.

FIG. 6 illustrates airstone aerator 200 and intake air connector 110 connected to anchor system 400 to form an aquarium aerator unit, which may operate in substantially the same manner as the system shown in FIG. 4.

Figure 7:
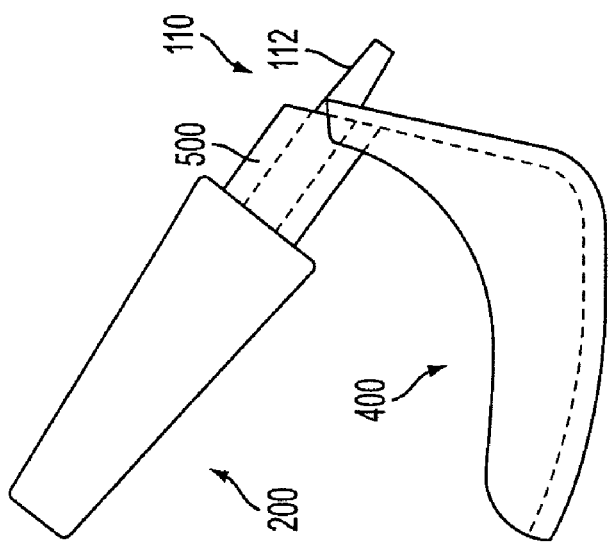
FIG. 7 illustrates the second exemplary airstone aerator with the first exemplary anchor system from a side view.

FIG. 7 shows a side view of airstone aerator 200 including intake air connector 110 and anchor system 400, which may operate in substantially the same manner as the system shown in FIG. 4.

FIG. 8 illustrates airstone aerator 300 and intake air connector 310. Also shown in FIG. 8 is anchor system 800 which includes anchor portion 810 and anchor portion 820. Anchor portion 810 connects to intake air connector 310 by a hole or U-shaped friction fit in center portion 830 of anchor system 810. Anchor system 810 may include lower portion 840 and side portions 850 and 860. Center portion 830 may connect to side portions 850 and 860 by cross bars 870 and 880, respectively. Center portion 830 may connect to lower portion 840 by vertical bar 890. Alternative methods of connecting center portion 830 to anchor system 810 are also possible. Lower portion 840 may be implanted in the sand or gravel and the base of an aquarium in order to anchor system 800 and airstone aerator 310 in the bottom of the aquarium during usage. Lower portion 840 may be buried in the sand or gravel and the weight of the sand or gravel may counterbalance any flotation effect caused by the pressurized air forced into airstone aerator 300.

FIG. 9 shows airstone aerator 300 and anchor system 800 in a side view that form an aquarium aerator unit. Anchor portion 820 is illustrated as connecting to opposite portion 320 and may be arranged in a similar manner as anchor portion 810.

FIG. 10 illustrates anchor bubbler 1000, e.g., diffuser, connected to anchor system 1010. Anchor bubbler 1000 may be a plastic tube which includes porosities which allow pressurized air which has been inserted into the interior of anchor bubbler 1000 to escape through the porosities and create a distribution of fine bubbles in an aquarium. Anchor bubbler 1000 may connect to anchor portion 1020 of anchor system 1010 by inserting anchor bubbler 1000 into a receiving portion 1040 of anchor portion 1010. Receiving portion 1040 may provide a friction fit with anchor bubbler 1000. Receiving portion 1040 may also include an intake air connector 1050 for receiving pressurized air from a pressurized air source, and providing that pressurized air source, and providing that pressurized air into an interior portion of anchor bubbler 1000.

Anchor portion 1030 of anchor system 1010 may also include an anchor bubbler receiving portion 1060 which may include a cap portion 1070 which may prevent the escape of the pressurized air from the interior of anchor bubbler 1000. Anchor portion 1020 may include side portions 1080 and 1090, and anchor portion 1030 may include side portions 1100 and 1110. Side portions 1080 and 1090 may be angled downwards from receiving portions 1040, and may connect to bottom section 1120. Side portions 1100 and 1110 may be angled downwards from receiving portion 1060 and may connect to bottom section 1130. Anchor portions 1020 and 1030 may operate to hold anchor bubbler 1000, e.g., diffsuser, at the bottom of an aquarium by depositing sand and gravel on the top side of bottom portions 1120 and 1130 and stabilizing the sand and gravel using side portions 1080, 1090, 1100, and 1110.

FIG. 11 shows a side view of anchor bubbler 1000 and anchor system 1110.

FIG. 12 illustrates anchor bubbler 1000 connected to another anchor bubbler 1200 using connector anchor portion 1210. Connector anchor portion 1210 may include receiving portion 1220 and receiving portion 1230 which may be arranged opposed to receive anchor bubbler 1000 and anchor bubbler 1200 from opposite directions. Receiving portions 1220 and 1230 may communicate pressurized air between the interiors of anchor bubbler of 1000 and anchor bubbler 1200. The side portions and bottom portions of connector anchor portion 1210 may operate in a similar fashion to anchor portions 1020 and 1030.

FIG. 13 illustrates the anchor bubbler system shown in FIG. 12 from the side.

FIG. 14 illustrates that additional anchor bubbler 1400 may be connected using additional anchor portion connector 1410 to allow for longer sections of anchor bubblers to be connected in one portion. Anchor bubblers 1000, 1200, and 1400, e.g., diffusers, may be of various lengths, including but not limited to 6 inch and 9 inch sections, and therefore may be combine in any number of different ways to provide varying length bubblers.

FIG. 15 shows a side view of the anchor bubbler system shown in FIG. 14.

Figure 16:
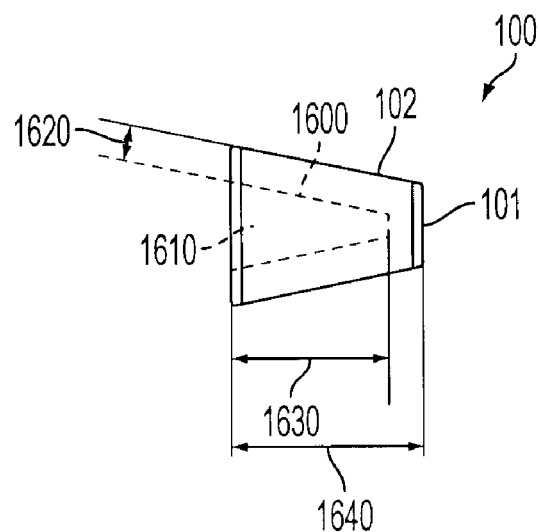
FIG. 16 illustrates the first exemplary airstone aerator in a cross-sectional view.

FIG. 16 shows a cross-sectional view of anchor aeration stone 100. As shown in FIG. 16, anchor stone 100 has an interior surface 1600 which may parallel the external shape of air stone aerator 100. Interior surface 1600 defines interior space 1610. The thickness of the walls of airstone aerator are indicated by thickness 1620, and may be substantially uniform. Thickness 1620 may be approximately 4.5 mm, or any other appropriate thickness. Airstone aerator may have a total length of 1640, which may be approximately 25 mm, and interior space 1610 may have a depth of 1630, which may be approximately 20 mm.

Figure 17:
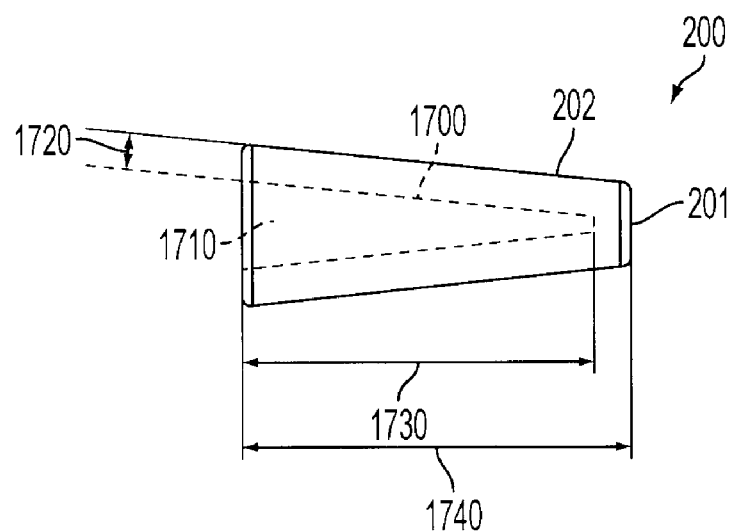
FIG. 17 illustrates the second exemplary airstone aerator in a cross-sectional view.

FIG. 17 illustrates a cross-sectional view of air stone aerator 200, e.g., diffuser. FIG. 17 shows a cross-sectional view of anchor aeration stone 200. As shown in FIG. 17, anchor stone 200 has an interior surface 1700 which may parallel the external shape of airstone aerator 200. Interior surface 1700 defines interior space 1710. The thickness of the walls of airstone aerator are indicated by thickness 1720, and may be substantially uniform. Thickness 1720 may be approximately 4.5 mm, or any other appropriate thickness. Airstone aerator may have a total length of 1740, which may be approximately 50 mm, and interior space 1710 may have a depth of 1730, which may be approximately 46 mm.

Figure 18:
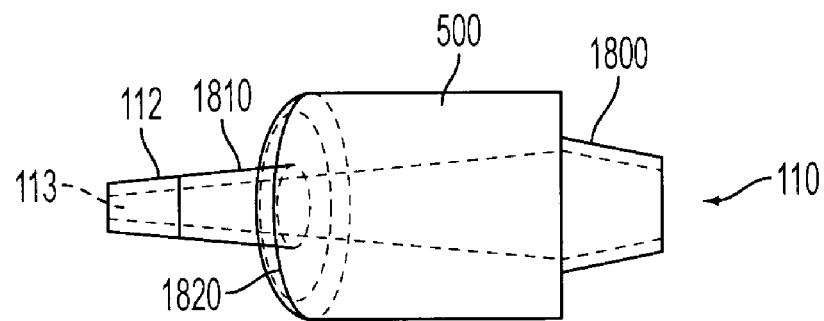
FIG. 18 illustrates an exemplary intake air connector in a cross-sectional, bottom view.

FIG. 18 illustrates a cross-sectional, bottom view of intake air connector 110. Intake air connector 110 may include cylindrical positioning element 500, stem 112, and air passageway 113. Stem 112 may connect to cylindrical positioning element 500, which may at the point of connection form connector region 1810 of stem 112, and positioning surface 1820 of cylindrical positioning element 500.

Figure 19:
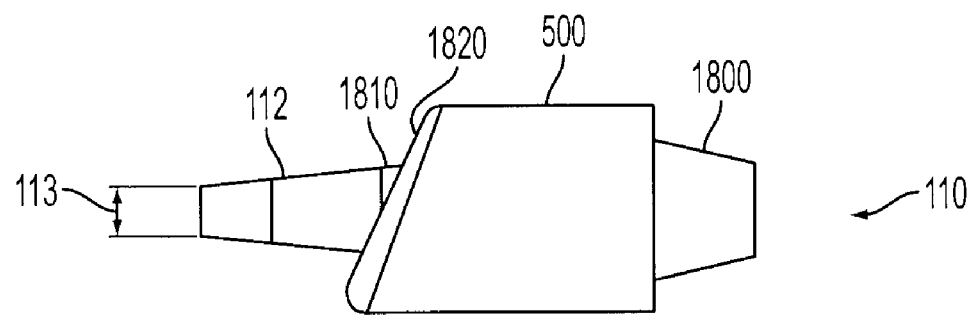
FIG. 19 illustrates the exemplary intake air connector in a side view.

FIG. 19 illustrates a side view of intake air connector 110.

Figure 20:
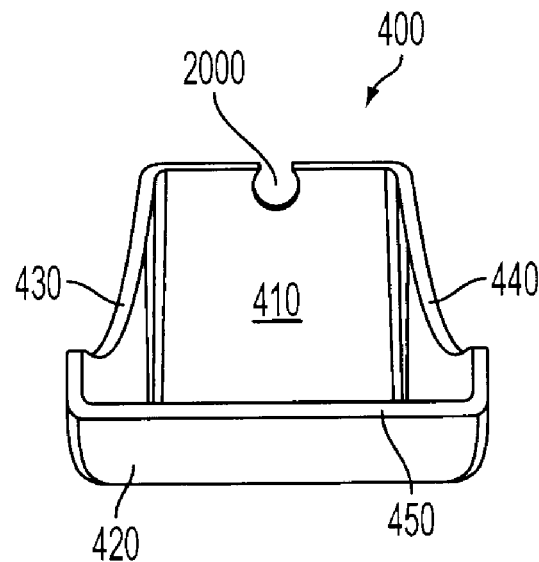
FIG. 20 illustrates an exemplary anchor system in a front view.

FIG. 20 illustrates a front view of anchor system 400. Anchor system 400 may include receiving region 2000 on upright portion 410. Receiving region 2000 may be configured to receive connector region 1810 of stem 112 of intake air connector 110 to form a friction fit between anchor system 400 and intake air connector 110. Upright portion 410 may be configured to interact with positioning surface 1820 of cylindrical positioning element 500 of intake air connector 110 to position and stabilize intake air connector 110 with respect to anchor system 500.

Figure 21:
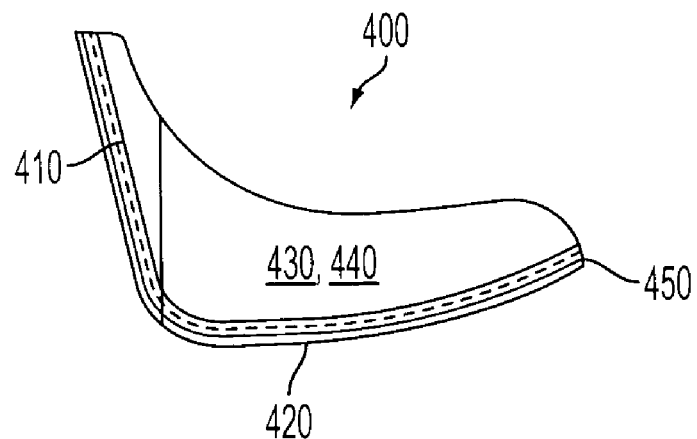
FIG. 21 illustrates the exemplary anchor system in a side view.

FIG. 21 illustrates a side view of anchor system 400.

The specific embodiments of the airstone aerator and anchor system provided herein are merely exemplary in nature, and are not intended to limit the breadth of this disclosure.

What is claimed is:
1. An aquarium aerator unit comprising:
    an anchor weighted by an aquarium bedding material, the anchor comprising
        a lower portion comprising a shovel edge,
        spaced-apart side sections proximate to the lower portion,
        an upright portion joined to each side section by a respective cross-bar and joined to the lower portion by a vertical bar, the
        an inner space formed between the side sections above the lower portion and having at least two through-openings;

a diffuser for passing air and secured in the anchor, the diffuser comprising a stem that passes through a plane of the anchor to connect to an air line;

wherein the shovel edge eases the lower portion into the bedding material and the inner space storing the bedding material to enhance stability and aesthetics.

2. The aquarium aerator unit of claim 1, wherein the lower portion comprises a curve in a longitudinal direction.

3. The aquarium aerator unit of claim 1, wherein the inner space narrows distal from the defined edge for easier grasping by a user.

4. The aquarium aerator unit of claim 1 further comprising a diffuser angled approximately 45 degrees with respect to the lower portion.

5. The aquarium aerator unit of claim 1 further comprising a second anchor, the diffuser supported by the anchors.

6. The aquarium aerator unit of claim 5, wherein each of the anchors comprises a receiving portion for receiving ends of the diffuser.

7. The aquarium aerator unit of claim 5 further comprising a third anchor and a second diffuser supported by the second and third anchors.

8. The aquarium aerator unit of claim 7, wherein one of the anchors comprises a receiving portion that is configured to receive two diffusers.

9. The aquarium aerator unit of claim 8, wherein the receiving portion is configured to communicate pressurized air from one to diffuser to another diffuser.

10. The aquarium aerator unit of claim 1, wherein the diffuser comprises an epoxy resin compound.

11. The aquarium aerator unit of claim 1, wherein the anchor is integrally constructed.

12. The aquarium aerator unit of claim 1, wherein the anchor comprises a center portion having a vertical bar and two openings, one opening at each side spacing the vertical bar from the side sections.

13. The aquarium aerator unit of claim 1, wherein the anchor comprises a center section having a U-shaped portion for receiving the diffuser.

14. The aquarium unit of claim 1, wherein the anchor comprises a longitudinal length that is less than one-fourth of a longitudinal length of the diffuser.

15. An aquarium aerator unit comprising:

a plurality of anchors weighted by an aquarium bedding material, each anchor comprising a lower portion comprising a shovel edge, spaced-apart side sections proximate to the lower portion, an upright portion joined to each side section by a respective cross-bar and joined to the lower portion by a vertical bar, an inner space formed between the side sections above the lower portion and having at least two through-openings;

a diffuser for passing air and supported by the anchors;

wherein the shovel edge eases, the lower portion into the bedding material and the inner space storing the bedding material to enhance stability and aesthetics;

wherein the anchors are spaced apart from each other by a length of at least ¾ of a longitudinal length of the diffuser.

16. The aquarium aerator unit of claim 15, wherein at least one anchor comprises a center section having a U-shaped portion for receiving the diffuser.

17. The aquarium aerator unit of claim 15, wherein at least one anchor comprises a center portion having a vertical bar and two openings, one opening at each side spacing the vertical bar from the side sections.

* * * * *